(12) United States Patent
O'Neill et al.

(10) Patent No.: US 11,658,971 B1
(45) Date of Patent: *May 23, 2023

(54) VIRTUAL FIREWALLS FOR MULTI-TENANT DISTRIBUTED SERVICES

(71) Applicant: Amazon Technologies, Inc., Seattle, WA (US)

(72) Inventors: Kevin Ross O'Neill, Seattle, WA (US); Mark Joseph Cavage, Seattle, WA (US); Nathan R. Fitch, Seattle, WA (US); Anders Samuelsson, Redmond, WA (US); Brian Irl Pratt, Seattle, WA (US); Yunong Jeff Xiao, Seattle, WA (US); Bradley Jeffery Behm, Seattle, WA (US); James E. Scharf, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,099

(22) Filed: May 30, 2019

Related U.S. Application Data

(63) Continuation of application No. 14/553,915, filed on Nov. 25, 2014, now Pat. No. 10,313,346, which is a
(Continued)

(51) Int. Cl.
*H04L 9/40* (2022.01)
*H04L 41/28* (2022.01)
*H04L 67/00* (2022.01)

(52) U.S. Cl.
CPC .............. *H04L 63/10* (2013.01); *H04L 41/28* (2013.01); *H04L 63/0263* (2013.01);
(Continued)

(58) Field of Classification Search
CPC ......... H04L 63/10; H04L 63/20; H04L 41/28; H04L 63/0263; H04L 63/102
(Continued)

(56) References Cited

U.S. PATENT DOCUMENTS

| 5,021,953 | A | * | 6/1991 | Webber | .................. | G06Q 10/02 |
| | | | | | | 705/6 |
| 5,890,143 | A | | 3/1999 | Sakurai | | |

(Continued)

OTHER PUBLICATIONS

U.S. Appl. No. 12/861,692, "Final Office Action," dated May 14, 2013, 27 pages.
(Continued)

*Primary Examiner* — Saleh Najjar
*Assistant Examiner* — Peiliang Pan
(74) *Attorney, Agent, or Firm* — Kilpatrick Townsend & Stockton LLP

(57) ABSTRACT

Virtual firewalls may be established that enforce sets of policies with respect to computing resources maintained by multi-tenant distributed services. Particular subsets of computing resources may be associated with particular tenants of a multi-tenant distributed service. A tenant may establish a firewalling policy set enforced by a virtual firewall for an associated subset of computing resources without affecting other tenants of the multi-tenant distributed service. Virtual firewalls enforcing multiple firewalling policy sets may be maintained by a common firewalling component of the multi-tenant distributed service. Firewalling policy sets may be distributed at multiple locations throughout the multi-tenant distributed service. For a request targeting a particular computing resource, the common firewalling component may identify the associated virtual firewall, and submit the request to the virtual firewall for evaluation in accordance with the corresponding firewalling policy set.

18 Claims, 10 Drawing Sheets

Related U.S. Application Data continuation of application No. 12/861,692, filed on Aug. 23, 2010, now Pat. No. 8,904,511.

(52) U.S. Cl.
CPC .............. H04L 63/20 (2013.01); H04L 67/00 (2013.01); *H04L 63/08* (2013.01); *H04L 63/102* (2013.01)

(58) Field of Classification Search
USPC .......................................................... 726/11
See application file for complete search history.

(56) References Cited

U.S. PATENT DOCUMENTS

| | | | | |
|---|---|---|---|---|
| 6,345,288 | B1* | 2/2002 | Reed | H04L 63/045 707/999.001 |
| 6,484,261 | B1 | 11/2002 | Wiegel | |
| 6,502,131 | B1* | 12/2002 | Vaid | H04L 1/1854 709/224 |
| 6,728,885 | B1 | 4/2004 | Taylor et al. | |
| 6,775,704 | B1* | 8/2004 | Watson | G06F 9/547 719/330 |
| 6,779,120 | B1* | 8/2004 | Valente | H04L 41/0609 717/117 |
| 6,845,452 | B1* | 1/2005 | Roddy | H04L 63/08 709/227 |
| 6,981,029 | B1 | 12/2005 | Menditto et al. | |
| 7,013,482 | B1* | 3/2006 | Krumel | H04L 63/0227 726/13 |
| 7,072,934 | B2 | 7/2006 | Helgeson et al. | |
| 7,233,935 | B1 | 6/2007 | Chandler | |
| 7,324,972 | B1* | 1/2008 | Oliver | G06Q 10/00 705/26.1 |
| 7,343,488 | B2 | 3/2008 | Yadav | |
| 7,350,226 | B2 | 3/2008 | Moriconi et al. | |
| 7,363,650 | B2 | 4/2008 | Moriconi et al. | |
| 7,418,475 | B2* | 8/2008 | Stewart | G06Q 10/06 709/204 |
| 7,447,755 | B1* | 11/2008 | Maxted | H04L 63/0227 709/223 |
| 7,447,777 | B1* | 11/2008 | Singh Ahuja | H04L 12/66 709/227 |
| 7,509,369 | B1* | 3/2009 | Tormasov | G06F 9/5077 709/201 |
| 7,512,965 | B1* | 3/2009 | Amdur | H04L 63/20 726/1 |
| 7,522,060 | B1* | 4/2009 | Tumperi | G06Q 50/26 340/573.4 |
| 7,606,146 | B1* | 10/2009 | Pan | H04L 47/724 370/229 |
| 7,769,394 | B1* | 8/2010 | Zhu | H04M 1/72572 455/456.1 |
| 7,873,711 | B2 | 1/2011 | Adams et al. | |
| 7,921,197 | B2 | 4/2011 | Soundararajan | |
| 8,019,812 | B2 | 9/2011 | Janedittakarn et al. | |
| 8,131,784 | B1* | 3/2012 | Zhuge | G06F 16/113 707/823 |
| 8,281,372 | B1* | 10/2012 | Vidal | H04L 51/12 726/5 |
| 8,478,226 | B2 | 7/2013 | Bakker et al. | |
| 8,572,733 | B1* | 10/2013 | Rockwood | H04L 63/1408 726/23 |
| 8,584,195 | B2* | 11/2013 | Sherlock | H04L 63/1425 726/1 |
| 8,612,321 | B2* | 12/2013 | Tully | G06Q 40/06 705/35 |
| 9,183,384 | B1 | 11/2015 | Bruhmuller | |
| 9,226,222 | B2* | 12/2015 | Zhou | H04W 4/70 |
| 9,462,007 | B2* | 10/2016 | Yu | H04L 63/102 |
| 10,285,025 | B1* | 5/2019 | Baker | H04W 4/24 |
| 2002/0099834 | A1 | 7/2002 | Sielaff et al. | |
| 2002/0114274 | A1* | 8/2002 | Sturges | H04L 47/2408 370/231 |
| 2003/0041266 | A1 | 2/2003 | Ke et al. | |
| 2004/0111521 | A1* | 6/2004 | Igarashi | H04L 69/329 709/229 |
| 2004/0122730 | A1* | 6/2004 | Tucciarone | G06Q 30/02 705/14.36 |
| 2004/0133460 | A1* | 7/2004 | Berlin | G06Q 10/10 705/35 |
| 2004/0136386 | A1* | 7/2004 | Miller | H04L 67/564 370/389 |
| 2004/0172520 | A1 | 9/2004 | Smit et al. | |
| 2005/0078660 | A1* | 4/2005 | Wood | H04L 45/306 370/352 |
| 2005/0125692 | A1* | 6/2005 | Cox | H04L 63/0272 726/4 |
| 2005/0257256 | A1* | 11/2005 | Supnik | H04L 63/0209 726/11 |
| 2006/0004832 | A1 | 1/2006 | Langsford et al. | |
| 2006/0015512 | A1* | 1/2006 | Alon | H04L 67/10 |
| 2006/0026671 | A1* | 2/2006 | Potter | H04L 69/24 726/7 |
| 2006/0036764 | A1* | 2/2006 | Yokota | H04L 67/322 709/240 |
| 2006/0143699 | A1* | 6/2006 | Nagata | H04L 63/0227 726/11 |
| 2006/0156403 | A1 | 7/2006 | Haeffele et al. | |
| 2006/0200580 | A1 | 9/2006 | Wool | |
| 2006/0246495 | A1 | 11/2006 | Garrett et al. | |
| 2007/0016467 | A1 | 1/2007 | John et al. | |
| 2007/0111316 | A1 | 5/2007 | Shi et al. | |
| 2007/0124577 | A1* | 5/2007 | Nielsen | H04L 63/102 726/13 |
| 2007/0136413 | A1* | 6/2007 | Ishikawa | H04L 65/1006 709/200 |
| 2007/0230503 | A1 | 10/2007 | Jeanne et al. | |
| 2007/0300296 | A1* | 12/2007 | Kudla | H04L 63/101 726/13 |
| 2008/0028055 | A1* | 1/2008 | Dolev | H04L 61/2557 709/222 |
| 2008/0052395 | A1* | 2/2008 | Wright | H04L 63/20 709/224 |
| 2008/0082504 | A1 | 4/2008 | Jasik et al. | |
| 2008/0141333 | A1* | 6/2008 | Chen | H04L 47/808 726/1 |
| 2008/0163357 | A1 | 7/2008 | Xiao | |
| 2008/0167024 | A1* | 7/2008 | Zabawskyj | H04L 51/12 455/466 |
| 2008/0189776 | A1 | 8/2008 | Constable | |
| 2008/0196099 | A1* | 8/2008 | Shastri | H04L 69/163 726/12 |
| 2008/0244691 | A1 | 10/2008 | Hilerio et al. | |
| 2008/0288428 | A1 | 11/2008 | Birdwell et al. | |
| 2009/0019518 | A1 | 1/2009 | Lee et al. | |
| 2009/0104605 | A1 | 4/2009 | Siuzdak et al. | |
| 2009/0113516 | A1* | 4/2009 | Vorreiter | G06F 21/6218 726/1 |
| 2009/0144444 | A1 | 6/2009 | Chauffour et al. | |
| 2009/0164269 | A1* | 6/2009 | Gupta | G06Q 30/0246 705/14.47 |
| 2009/0178107 | A1 | 7/2009 | Karjoth et al. | |
| 2009/0288084 | A1* | 11/2009 | Astete | G06F 9/45558 718/1 |
| 2009/0316709 | A1* | 12/2009 | Polch | H04L 65/4076 370/401 |
| 2010/0061386 | A1* | 3/2010 | Olsson | H04W 76/11 370/401 |
| 2010/0088722 | A1* | 4/2010 | Jiang | H04N 7/17354 725/39 |
| 2010/0100949 | A1 | 4/2010 | Sonwane et al. | |
| 2010/0103837 | A1 | 4/2010 | Jungck et al. | |
| 2010/0121923 | A1 | 5/2010 | Cvetkovic et al. | |
| 2010/0161759 | A1 | 6/2010 | Brand | |
| 2010/0161967 | A1* | 6/2010 | Roegner | H04L 63/02 713/155 |
| 2010/0191863 | A1* | 7/2010 | Wing | H04L 61/2553 709/245 |

(56) References Cited

U.S. PATENT DOCUMENTS

| | | |
|---|---|---|
| 2010/0239077 A1 | 9/2010 | Michaelis et al. |
| 2010/0248720 A1* | 9/2010 | Millet ............... H04W 12/0609 455/435.1 |
| 2010/0268764 A1* | 10/2010 | Wee ................. H04L 67/1002 709/203 |
| 2010/0325710 A1* | 12/2010 | Etchegoyen ............ G06F 21/73 726/7 |
| 2010/0332617 A1 | 12/2010 | Goodwin et al. |
| 2011/0016499 A1* | 1/2011 | Liu .................... H04N 21/6118 725/98 |
| 2011/0075667 A1 | 3/2011 | Li et al. |
| 2011/0075675 A1 | 3/2011 | Koodli et al. |
| 2011/0119748 A1 | 5/2011 | Edwards et al. |
| 2011/0165858 A1* | 7/2011 | Gisby .................... H04M 3/56 455/411 |
| 2011/0225625 A1 | 9/2011 | Wolfson et al. |
| 2011/0262957 A1 | 10/2011 | Yang-Woytowitz et al. |
| 2011/0321130 A1* | 12/2011 | Tor ........................ H04L 63/102 726/4 |
| 2012/0099599 A1* | 4/2012 | Keranen ............ H04L 61/2589 370/392 |
| 2012/0167160 A1 | 6/2012 | Carney et al. |
| 2013/0042298 A1* | 2/2013 | Plaza Fonseca .... H04L 43/0876 726/1 |
| 2014/0215590 A1 | 7/2014 | Brand |
| 2017/0295133 A1* | 10/2017 | Barber .................... H04L 67/14 |

OTHER PUBLICATIONS

U.S. Appl. No. 12/861,692, "Non-Final Office Action," dated Oct. 26, 2012, 22 pages.

U.S. Appl. No. 12/861,692, "Non-Final Office Action," dated Mar. 28, 2014, 27 pages.

U.S. Appl. No. 12/861,692, "Notice of Allowance," dated Aug. 11, 2014, 8 pages.

U.S. Appl. No. 14/553,915, "Final Office Action," dated Apr. 15, 2016, 13 pages.

U.S. Appl. No. 14/553,915, "Final Office Action," dated Dec. 8, 2017, 17 pages.

U.S. Appl. No. 14/553,915, "Non Final Office Action," dated Jul. 10, 2018, 19 pages.

U.S. Appl. No. 14/553,915, "Non-Final Office Action," dated Nov. 23, 2015, 12 pages.

U.S. Appl. No. 14/553,915, "Non-Final Office Action," dated Apr. 19, 2017, 16 pages.

U.S. Appl. No. 14/553,915, "Notice of Allowance," dated Jan. 22, 2019, 8 pages.

Jiang et al., "Protection mechanisms for application service hosting platforms", IEEE article No. 1336693, Apr. 2004, pp. 656-663.

* cited by examiner

VIRTUAL FIREWALLS FOR MULTI-TENANT DISTRIBUTED SERVICES

CROSS-REFERENCE TO RELATED APPLICATIONS

This application is a continuation of U.S. patent application Ser. No. 14/553,915, filed Nov. 25, 2014, entitled "VIRTUAL FIREWALLS FOR MULTI-TENANT DISTRIBUTED SERVICES," and issued to U.S. Pat. No. 10,313,346 on Jun. 4, 2019, which is a continuation of U.S. patent application Ser. No. 12/861,692, filed Aug. 23, 2010, entitled "VIRTUAL FIREWALLS FOR MULTI-TENANT DISTRIBUTED SERVICES," and issued to U.S. Pat. No. 8,904,511 on Dec. 2, 2014, the contents of which are hereby incorporated by reference in their entireties.

BACKGROUND

As computer networks have grown in size, an initial focus on connectivity has been tempered by security concerns. For example, unrestricted flow of data traffic to a network containing a server computer hosting a public information facility can compromise the facility, the server and/or other computers connected to the network. Network firewalls have become a relatively common mechanism for addressing at least some such security concerns. In a typical configuration, a conventional network firewall interrupts a network connection, and allows data traffic to flow across the interruption in accordance with a set of rules. For example, the rules may allow or deny data traffic addressed to particular computers that are behind the firewall, and/or allow or deny data traffic in accordance with particular communication protocols. However, conventional network firewalls have some problematic limitations.

Increasingly, network facilities are implemented with computing infrastructure, such as computing hardware, that is not under the direct control of the facility provider. For example, an Internet Web site maintained by a facility provider may be implemented, at least in part, with a data object storage service purchased on a commodity basis (e.g., per gigabyte stored and/or transferred) from a vendor of such computing services. Such computing services may be implemented with various collections of computers and network elements that are allocated to multiple customers ("tenants") in accordance with service supply contracts and/or varying demand. Tenants need not be aware of which particular computers and/or network elements are allocated to implement their computing services, and this is generally regarded as a benefit. However, difficulties arise when attempting to use conventional firewalls with multi-tenant computing services. For example, rules established by one tenant at a conventional firewall protecting a multi-tenant distributed computing service can affect other tenants of the service.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, virtual firewalls are established that enforce sets of policies with respect to computing resources maintained by multi-tenant distributed services. Computing resources, such as data object stores, may be maintained by services implemented by (i.e., distributed across) multiple server computers. Particular subsets of computing resources may be associated with particular tenants of a multi-tenant distributed service. A tenant may establish a firewalling policy set enforced by a virtual firewall for an associated subset of computing resources without affecting other tenants of the multi-tenant distributed service and/or other virtual firewalls protecting other subsets of computing resources maintained by the multi-tenant distributed service.

Virtual firewalls enforcing multiple firewalling policy sets may be maintained by a common firewalling component (i.e., a common firewalling policy enforcement component) of the multi-tenant distributed service. Firewalling policy sets may be distributed at multiple locations throughout the multi-tenant distributed service, for example, some firewalling policies may be maintained local to associated computing resources, and some firewalling policies may be maintained local to an identity authentication service. Firewalling policies may be cached local to the common firewalling component, and updated responsive to policy update notifications. For a request targeting a particular computing resource, the common firewalling component may identify the associated firewalling policy set and/or enforcing virtual firewall, and submit the request to the virtual firewall for evaluation in accordance with the firewalling policy set.

Figure 1:
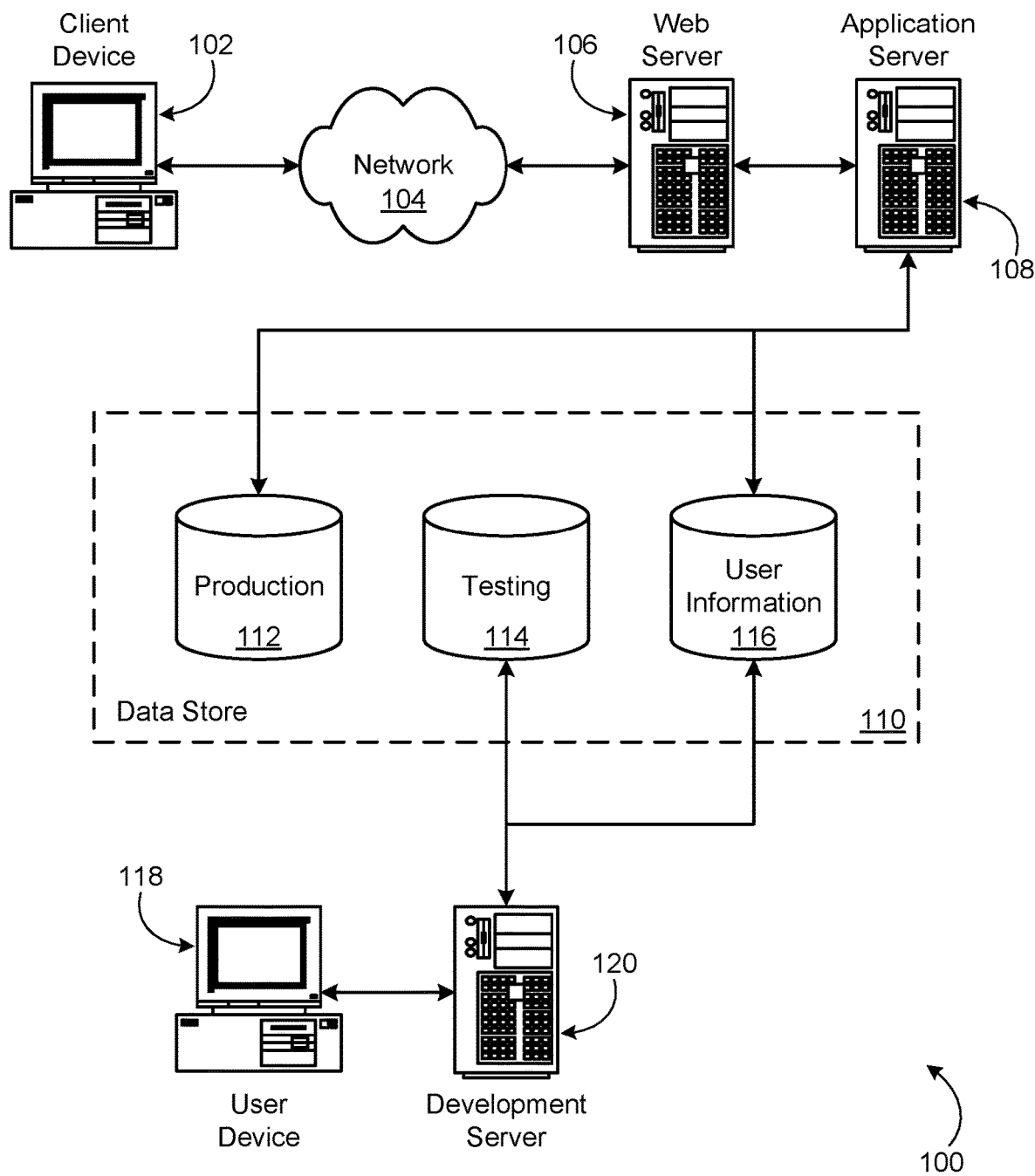
FIG. 1 is a schematic diagram illustrating an example environment for implementing aspects in accordance with at least one embodiment.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
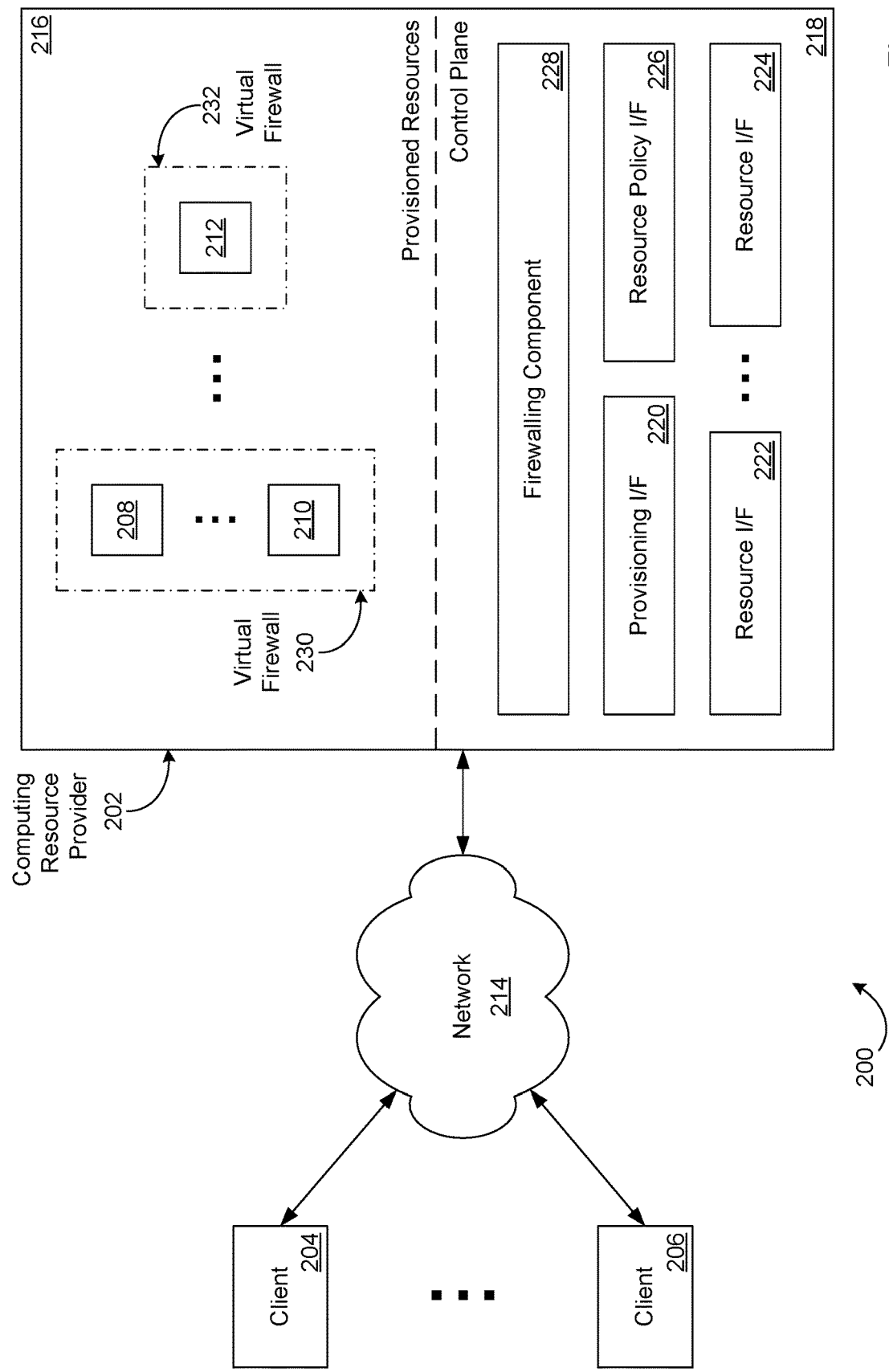
FIG. 2 is a schematic diagram depicting aspects of an example computing resource services architecture in accordance with at least one embodiment.

In at least one embodiment, one or more aspects of the environment 100 may incorporate and/or be incorporated into a computing resource services architecture. FIG. 2 depicts aspects of an example computing resource services architecture 200 in accordance with at least one embodiment. The example computing resource services architecture 200 includes a computing resource provider 202 enabling various clients 204, 206 to interact with provisioned computing resources 208, 210, 212 over a network 214. For example, the provisioned computing resources 208, 210, 212 may include data object stores, the clients 204, 206 may include Web browsers, and the network 214 may be a public network such as the Internet. The ellipsis between the clients 204 and 206 indicates that the computing resource services architecture 200 may include any suitable number (e.g., thousands, millions, and more) of clients although, for clarity, only two are shown. Similarly, the ellipses between the provisioned computing resources 208, 210, 212 indicates that the computing resource provider 202 may maintain any suitable number of such computing resources.

The computing resource provider 202 may be implemented, at least in part, with server computers such as the Web server 106 and the application server 108 described above with reference to FIG. 1, and one or more data stores such as the data store 110 of FIG. 1, interconnected by a relatively high speed data network (not shown in FIG. 2). The server computers and/or data store(s) implementing the computing resource provider 202 may include different types and/or configurations of server computers and/or data store(s) assigned to a provisioned resources portion 216 and a control plane 218 of the computing resource provider 202. The control plane 218 may include a provisioning interface 220 with which authorized clients (e.g., among the clients 204, 206) may interact to provision the computing resources 208, 210, 212. The clients 204, 206 may interact with the computing resources 208, 210, 212 utilizing resource interfaces 222, 224. The computing resource provider 202 may include a resource interface 222, 224 for each type of provisioned computing resource. The ellipsis between the resource interfaces 222 and 224 indicates that the computing resource provider 202 may include any suitable number of resource interfaces, although, for clarity, only two are shown. In at least one embodiment, the computing resource provider 202 may further include provisioned resources with which the clients 204, 206 may interact directly without mediation by a resource interface in the control plane 218.

Authorized clients (e.g., among the clients 204, 206) may interact with a resource policy interface 226 of the control plane 218 to specify resource policies, including firewalling policies, with respect to sets of the computing resources 208, 210, 212. A firewalling component 228 of the control plane 218 may enforce the resource policies specified with the resource policy interface 226 to maintain virtual firewalls 230, 232 around the computing resources 208, 210, 212. In the example depicted in FIG. 2, a first virtual firewall 230 corresponding to a first set of firewalling policies protects a first set of computing resources 208, 210, and a second virtual firewall 232 corresponding to a second set of firewalling policies protects a second set of computing resources 212. Any suitable number of firewalling policy sets corresponding to virtual firewalls may be specified to protect computing resource sets of any suitable size.

The computing resources 208, 210, 212 may include any computing resources suitable for provisioning to customers of the computing resource provider 202. Such customers may include the computing resource provider 202 itself. Examples of suitable computing resources include data object stores including block data stores such as virtual file volumes, data processing agents including programs, programming language interpreters, and virtual machines, and suitable combinations and configurations thereof. An example resource interface in accordance with at least one embodiment is described below in more detail with reference to FIG. 5. Resource policies specified with the resource policy interface 226 may be stored and/or maintained with computing resources 208, 210, 212, and thus be subject to firewalling policies.

The provisioning interface 220 may include any suitable provisioning interface elements. Examples of suitable provisioning interface elements include interface elements that provision, configure, reconfigured and/or de-provision the computing resources 208, 210, 212, as well as interface elements that provide access to computing resource configuration information, and one or more interface elements enabling authentication to establish authority for such provisioning-related operations. The provisioning interface 220 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 220 correspond to messages of a communication protocol, and/or any suitable combination thereof. In at least one embodiment, the provisioning interface 220 for one or more of the provisioned resource types is incorporated into its corresponding resource interface 222-224.

The resource policy interface 226 may include any suitable resource policy interface elements. Examples of suitable resource policy interface elements include interface elements that create, read, update and/or delete resource policies. As for the provisioning interface 220, the resource policy interface 226 may incorporate and/or be incorporated in a user interface (UI) such as a graphical user interface (GUI), a Web-based interface, a programmatic interface such as an application programming interface (API) and/or a set of remote procedure calls (RPCs) corresponding to resource policy interface elements, a messaging interface such as a messaging interface in which the interface elements of the resource policy interface 226 correspond to messages of a communication protocol, and/or any suitable combination thereof. An example firewalling component 228 in accordance with at least one embodiment is described below in more detail with reference to FIG. 6.

Figure 3:
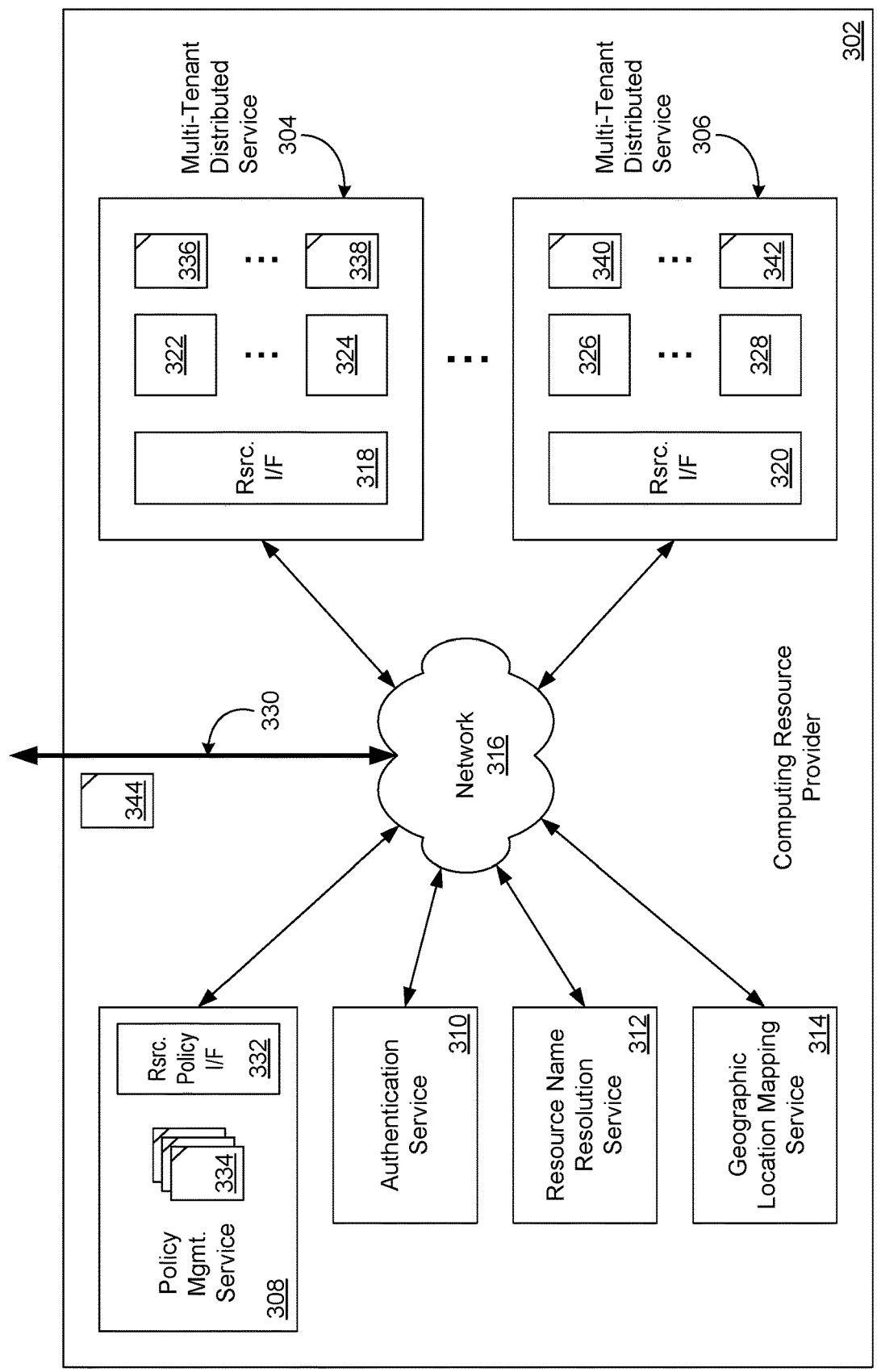
FIG. 3 is a schematic diagram depicting aspects of an example computing resource provider in accordance with at least one embodiment.

The depiction of the computing resource provider 202 in FIG. 2 emphasizes its control plane 202 or supervisory layer and provisioned resources 204 portion or provisioned resource layer aspects. In at least one embodiment, more server computers may be utilized to support the provisioned resources 204 than the control plane 202. FIG. 3 depicts aspects of another example computing resource provider 302 in accordance with at least one embodiment. The example computing resource provider 302 includes multi-tenant distributed services 304, 306, a policy management service 308, an authentication service 310, a resource name resolution service 312, and a geographic location mapping service 314, each interconnected by a network 316. The arrow 330 indicates that the network 316 is connected to the network 214 of FIG. 2.

The ellipsis between the multi-tenant distributed services 304 and 306 indicates that the computing resource provider 302 may include any suitable number of multi-tenant distributed services, including a single multi-tenant distributed service. The computing resource provider 302 may include a multi-tenant distributed service 304, 306 for each type of provisioned computing resource 208, 210, 212 (FIG. 2) and/or each resource interface 222, 224. The resource interfaces 318, 320 of FIG. 3 are examples of the resource interfaces 222, 224 of FIG. 2. Similarly, the computing resources 322, 324, 326, 328 of FIG. 3 are examples of the computing resources 208, 210, 212 of FIG. 2. For example, the multi-tenant distributed service 304 may be a data object storage service maintaining data object stores 322, 324 with which the clients 204, 206 interact (e.g., attempt to store and/or retrieve data objects) utilizing the resource interface 318.

The policy management service 308 may manage resource policies, including firewalling policies, for the computing resource provider 302. The policy management service 308 may include a resource policy interface 332. The resource policy interface 332 is an example of the resource policy interface 226 of FIG. 2. Clients 204, 206 may interact with the resourced policy interface 332 to specify resource policies 334, including firewalling policies, with respect to computing resources 322, 324, 326, 328. The policy management service 308 may act as a centralized resource policy store for the computing resource provider 302. However, in at least one embodiment, resource policies, including firewalling policies, may be maintained by and/or supplied by entities other than the policy management service 308. For example, in at least one embodiment, the resource interfaces 318, 320 are capable of creating, reading, updating and/or deleting resource policies 336, 338, 340, 342 maintained by the multi-tenant distributed services 304, 306. The ellipses between the resource policies 336, 338, 340, 342 indicates that the multi-tenant distributed services 304, 306 may maintain any suitable number of such resource policies. For example, the multi-tenant distributed services 304, 306 may maintain a set of the resource policies 336, 338, 340, 342 for each computing resource 322, 324, 326, 328. In addition, resource policies such as the resource policy 344 may be maintained at a location external to the computing resource provider 302, and supplied for enforcement as part of interactions with the resource interfaces 318, 320.

Tenants of the multi-tenant distributed services 304-306 may correspond to authoritative service accounts with the computing resource provider. For example, tenants may be responsible for costs associated with maintaining the provisioned computing resources 322-328. Tenants may delegate various authorities to users of the provisioned computing resources 322-328, including authority to set resource policies 336-342 with respect to the provisioned computing resources 322-328.

Resource policies 334-344 may reference a set of the provisioned computing resources 322-328, a set of actions that may be performed with respect to the set of the provisioned computing resources 322-328, and a set of conditions to be satisfied before the set of actions are permitted. The set of actions may include any suitable action that may be performed with respect to the set of the provisioned computing resources 322-328. For example, the actions may correspond to elements of a programmatic and/or messaging interface as described below in more detail with reference to FIG. 5.

The set of conditions may include any conditions suitable for controlling performance of the set of actions. Examples of suitable condition parameters include parameters associated with a request to perform one or more of the set of actions such as physical layer, data link layer, network layer, transport layer, session layer, presentation layer and/or application layer communication parameters in accordance with an International Standards Organization (ISO) model for open systems interconnection, e.g., the OSI reference model as described by Hubert Zimmermann, "OSI Reference Model—The ISO Model of Architecture for Open Systems Interconnection," IEEE Transactions on Communications, April 1980. Such condition parameters include originating network address, one or more protocols associated with the request, whether the protocol utilized an internet protocol or a particular type of internet protocol such as IPv6, IPSec, whether the protocol is encrypted such as with a secure socket layer (e.g., SSL), a virtual private network (VPN), a time, time period and/or type of time period associated with the request such as time of day, an identity of the client 204-206 originating the request such as the user-agent string of an Internet browser. Further examples of suitable condition parameters include operating environment parameters such as the current time according to one or more clocks, originating geographical location, originating political and/or administrative division, authenticated provisioned computing resources 322-328 user originating the request and/or type of authentication utilized to authenticate the user, tenant-defined security boundaries corresponding to sets of provisioned computing resources 322-328, whether the request originated from within or external to the computing resource provider 302 including whether the request originated from a particular multi-tenant distributed service 304-306, and suitable combinations thereof.

At times, actions performed in response to requests may result in a transfer of data from the provisioned computing resources 322-328. Examples of suitable condition parameters further include parameters associated with destinations of such data transfers including destination network address, geographical location, political and/or administrative division, authenticated user receiving the transfer, whether the destination is external to the virtual private network (VPN) or other security boundary associated with the request including tenant-defined security boundaries corresponding to sets of provisioned computing resources 322-328, whether the destination is external to the computing resource provider 302 including whether the request originated from a particular multi-tenant distributed service 304-306, and suitable combinations thereof. In at least one embodiment, the ability to enforce firewalling policies based at least in part on such condition parameters facilitates extension of virtual private networks to virtual private clouds (VPCs) incorporating virtual private networks and corresponding sets of provisioned computing resources 208-212 (FIG. 2) behind virtual firewalls 203-232.

One or more conditions in the set of conditions may explicitly permit the set of actions when a set of condition parameters take on a specified set of values, and/or when the set of condition parameters takes on values other than the specified set of values. One or more conditions may explicitly deny the set of actions when the set of condition parameters takes on the specified set of values and/or values other than the specified set of values. Wildcards may be utilized to specify the set of value, including wildcards that correspond to all possible values. Conditions in the set of conditions may be combined with Boolean operators. The firewalling component 228 may maintain a default and/or global meta-policy requiring a policy that grants explicit permission for an action and the absence of a policy that explicitly denies the action before allowing the action to occur.

For example, the provisioned computing resource 322 may have an associated firewalling policy 336 specifying that the provisioned computing resource 322 may only be accessed from a specified set of internet protocol (IP) addresses, or a specified set of geographic locations. As another example, the provisioned computing resource 324 may have an associated firewalling policy 338 specifying that the provisioned computing resource 324 may not, in response to a request, provide data over unsecured connections through the network 214 (FIG. 2). As yet another example, the provisioned computing resource 326 may have an associated firewalling policy 340 specifying that the provisioned computing resource 326 may only be accessed by a specified set of the provisioned computing resources 322-328. As still another example, the provisioned computing resource 328 may have an associated firewalling policy 342 specifying that the provisioned computing resource 328 may transfer data only to network 214 locations within a specified set of political divisions, or a specified set of virtual private clouds (VPCs).

The authentication service 310 may provide authentication services for the computing resource provider 302. For example, the authentication service 310 may authenticate an integrity and/or an authenticity of resource policies 334, 336, 338, 340, 342, 344. In addition, the authentication service 310 may authenticate an identity of clients 204, 206, tenants and/or users of the computing resource provider 302. For example, the resource policy interface 332 and/or the resource interfaces 318, 320 may utilize the authentication service 310 to establish and/or verify an identify and/or authority of a user with respect to resource policies 334, 336, 338, 340, 342, 344 and/or computing resources 322, 324, 326, 328. The authentication service 310 may utilize any suitable authentication mechanism, including any suitable cryptographic authentication mechanism, to provide the authentication services. Such authentication mechanisms are well known in the art and need not be detailed here.

Computing resources 322, 324, 326, 328 maintained by the computing resource provider 302 may be associated with various labeling and/or naming schemes ("resource names"). Such resource names may be particular to the computing resource provider 302 and/or in accordance with a resource naming standard such the Uniform Resource Name (URN) standard described by Ryan Moats, "URN Syntax", Internet Engineering Task Force (IETF) Request for Comments (RFC) 2141, May 1997. The resource name resolution service 312 of the computing resource provider 302 may map such resource names to computing resource 322, 324, 326, 328 locations within the computing resource provider 302. For example, the resource name resolution service 312 may map resource names to the appropriate multi-tenant distributed service 304, 306, particular server computers (not shown in FIG. 3) that participate in maintaining the computing resources 322, 324, 326, 328, and/or the network addresses thereof. Resource names referenced by resource policies 334, 336, 338, 340, 342, 344 may be resolved with the resource name resolution service 312.

Resource policies 334, 336, 338, 340, 342, 344 may reference geographic locations and/or regions (collectively, "geographic locations") such as countries, states, cities, geographic regions defined by laws, geographic regions defined by physical co-ordinates, geographic regions defined by any suitable attribute(s) of the geographic regions, and suitable combinations thereof. The geographic location mapping service 314 may associate one or more such geographic locations with incoming requests to and/or outgoing request responses from the resource interfaces 318, 320 and/or the resource policy interface 332. For example, the geographic location mapping service 314 may base such geographic location associations on one or more attributes of the request and/or response and/or on associated context information such as origin and/or destination network address (e.g., in the network 214 of FIG. 2) of the request and/or response.

Figure 4:
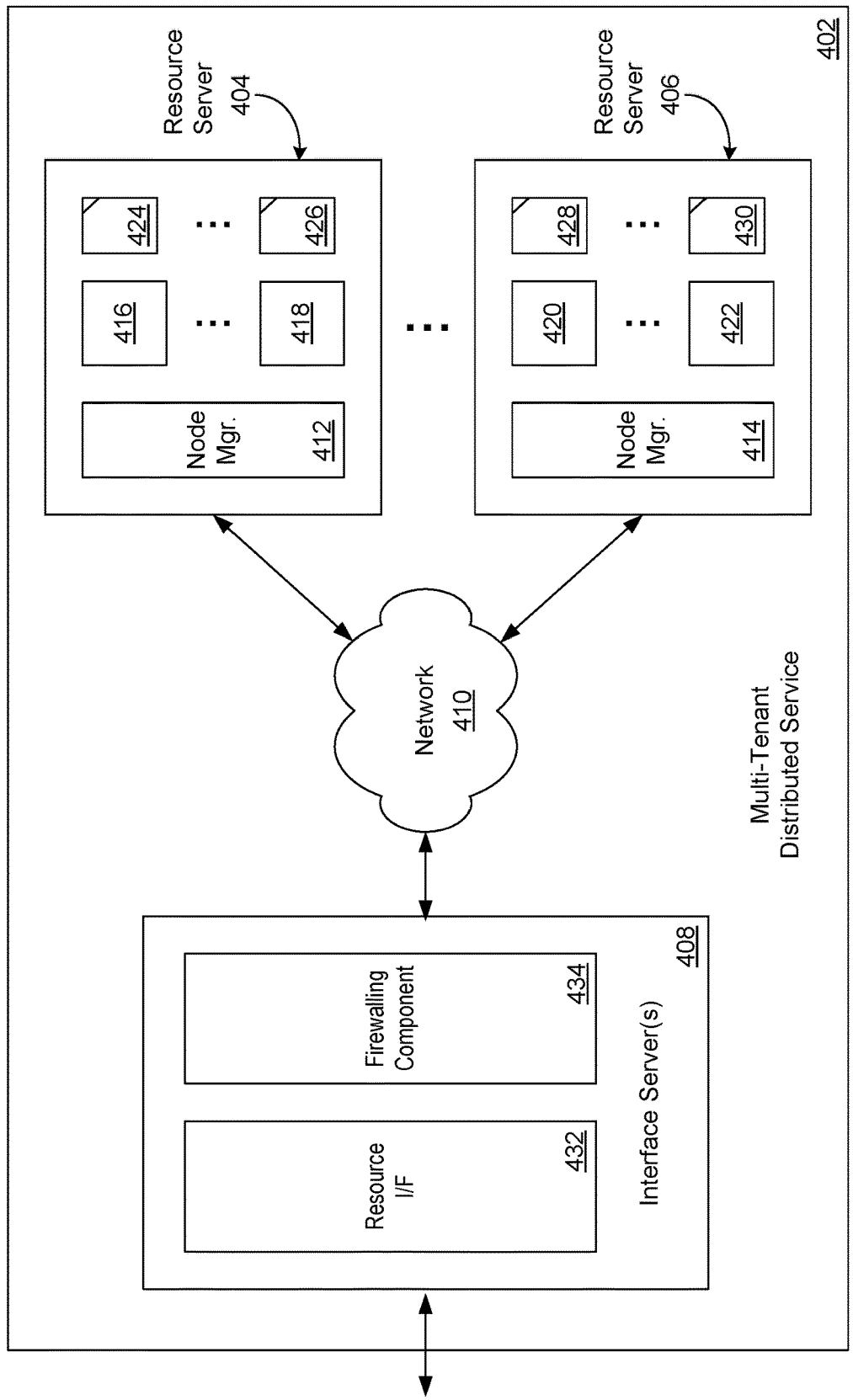
FIG. 4 is a schematic diagram depicting aspects of an example multi-tenant distributed service in accordance with at least one embodiment.

Each multi-tenant distributed service 304, 306 may be implemented with a collection of server computers and/or network elements. FIG. 4 depicts aspects of an example multi-tenant distributed service 402 in accordance with at least one embodiment. The multi-tenant distributed service 402 depicted in FIG. 4 is an example of the multi-tenant distributed service 304 of FIG. 3. The example multi-tenant distributed service 402 includes multiple resource servers 404, 406 and one or more interface servers 408 interconnected by a network 410. The ellipsis between the resource servers 404 and 406 indicates that the multi-tenant distributed service 402 may include any suitable number of resource servers although, for clarity, only two are shown.

Each resource server 404, 406 may include a node manager 412, 414. The node managers 412, 414 may co-operate with each other and/or with one or more additional supervisory servers (not shown in FIG. 4) to reliably and efficiently maintain the provisioned computing resources 322, 324 (FIG. 3) and associated resource policies 336, 338. For example, the mode managers 412, 414 may collectively distribute the provisioned computing resources 322, 324 and associated resource policies 336, 338 among the resource servers 404, 406. Each resource server 404, 406 may maintain a subset of the provisioned computing resources 322, 324 (FIG. 3). For example, the provisioned computing resources 416 through 418 (FIG. 4) may correspond to a first subset of the provisioned computing resources 322, 324 (FIG. 3), and the provisioned computing resources 420 through 422 (FIG. 4) may correspond to a second subset of the provisioned computing resources 322, 324 (FIG. 3). Such subsets 416-418 and 420-422 may deliberately overlap for various purposes including data durability and service capacity.

Similarly, each resource server 404, 406 may maintain a subset of the resource policies 336, 338 (FIG. 3). For example, the resource policies 424 through 426 (FIG. 4) may correspond to a first subset of the resource policies 336, 338 (FIG. 3), and the resource policies 428 through 430 (FIG. 4) may correspond to a second subset of the resource policies 336, 338 (FIG. 3). Again, such subsets 424-426 and 428-430 may overlap for various purposes. Resource policy subsets 424-426 and 428-430 may correspond to provisioned computing resource subsets 416-418 and 420-422, respectively. For example, resource policies 424-426 on the resource server 404 may reference provisioned computing resources 416-418 on the resource server 404. However, the correspondence need not be strict, and some resource servers may even be dedicated to provisioned computing resources or resource polices. The node managers 412, 414 may utilize any suitable resource distribution algorithm for distributing the provisioned computing resources 416-418, 420-422 and the resource policies 424-426, 428-430. Such resource distribution algorithms are well known to those of skill in the art, and need not be described here in detail.

The interface server(s) 408 may (collectively) maintain a resource interface 432 and a firewalling component 434. The resource interface 432 of FIG. 4 is an example of the resource interface 318 of FIG. 3. The firewalling component 434 of FIG. 4 is an example of the firewalling component 228 of FIG. 2. The firewalling component 228 of FIG. 2 may be implemented at least in part with multiple firewalling components such as the firewalling component 434 of FIG. 4 cooperating in a peer-to-peer manner and/or with reference to one or more centralized firewalling component coordinators (not shown in FIG. 4). For example, each multi-tenant distributed service 304, 306 may include a firewalling component corresponding to the firewalling component 434 of FIG. 4. The firewalling component 434 may co-operate with the resource interface 432 to enforce firewalling policies of the resource polices 334, 336-338, 340-342 (FIG. 3). For example, the resource interface 432 may pass received requests to the firewalling component 434 for evaluation with respect to relevant policies of the resource polices 334, 336-338, 340-342, and require a positive evaluation by the firewalling component 434 before taking action with respect to the provisioned computing resources 416-428, 420-422 in accordance with the received request.

Figure 5:
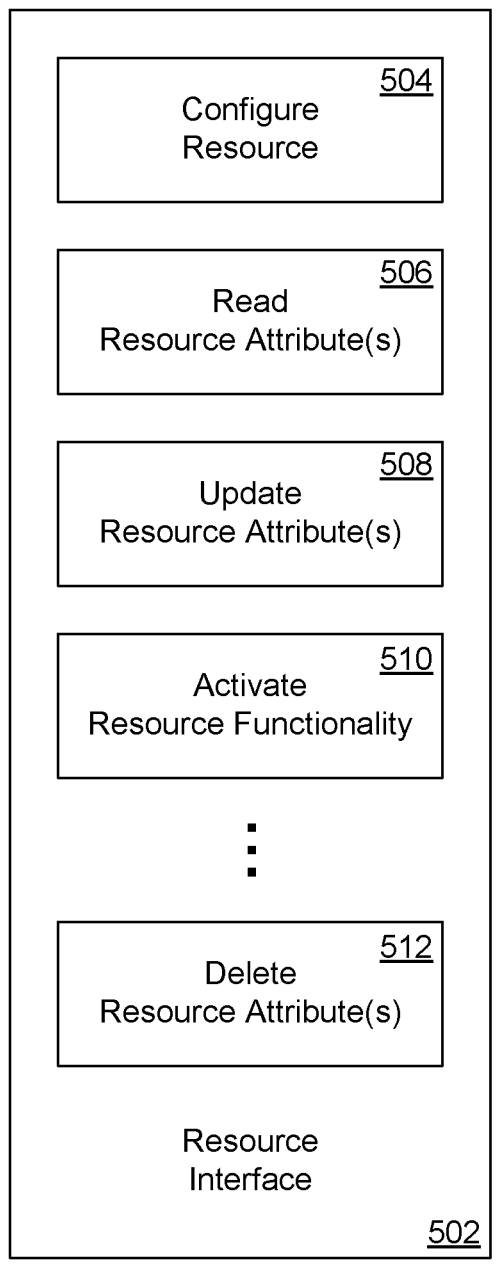
FIG. 5 is a schematic diagram depicting aspects of an example resource interface in accordance with at least one embodiment.

FIG. 5 depicts aspects of an example resource interface 502 in accordance with at least one embodiment of the invention. The example resource interface 502 includes a configure resource interface element 504, a read resource attribute(s) interface element 506, an update resource attribute(s) interface element 508, an activate resource functionality interface element 510 and a delete resource attribute(s) interface element 512. The ellipsis between the activate resource functionality interface element 510 and the delete resource attribute(s) interface element 512 indicates that the resource interface 502 may include any suitable number of interface elements of any suitable type. Each interface element 504-512 defines a structured interaction with the provisioned computing resources 322-324 (FIG. 3). In the example resource interface 502, each interface element 504-512 corresponds to a set of messages of a Web-based services protocol such as extensible markup language (XML) encoded remote procedure calls (e.g., XML-RPC) or a simple object access protocol (e.g., SOAP).

Clients 204-206 (FIG. 2) may utilize the configure resource interface element 504 to configure and/or reconfigure provisioned computing resources 322-324 (FIG. 3). For example, if the provisioned computing resources 322-324 include data object stores, the configure resource interface element 504 may enable clients 204-206 to set a maximum size of data object stores over which they have authority. Clients 204-206 may utilize the read resource attribute(s) interface element 506 to read or view one or more attributes of provisioned computing resources 322-324. For example, the read resource attribute(s) interface element 506 may enable clients 204-206 to obtain copies of specified data objects from specified data object stores. Clients 204-206 may utilize the update resource attribute(s) interface element 508 to update one or more attributes of provisioned computing resources 322-324. For example, the update resource attribute(s) interface element 508 may enable clients 204-206 to update specified data objects and/or create specified data objects in specified data object stores.

Some provisioned computing resources 322-324 (FIG. 3) may have functionality that can be activated, and the activate resource functionality interface element 510 may be utilized to activate that functionality. For example, some types of data object store may have a capability to analyze stored data objects, and the activate resource functionality interface element 510 may enable authorized clients to start, stop, suspend and/or perform the analysis. The delete resource attribute(s) interface element 512 may enable authorized clients to delete and/or re-initialize one or more attributes of provisioned computing resources 322-324. For example, clients 204-206 (FIG. 2) with sufficient authorization may delete specified data objects from specified data object stores.

Figure 6:
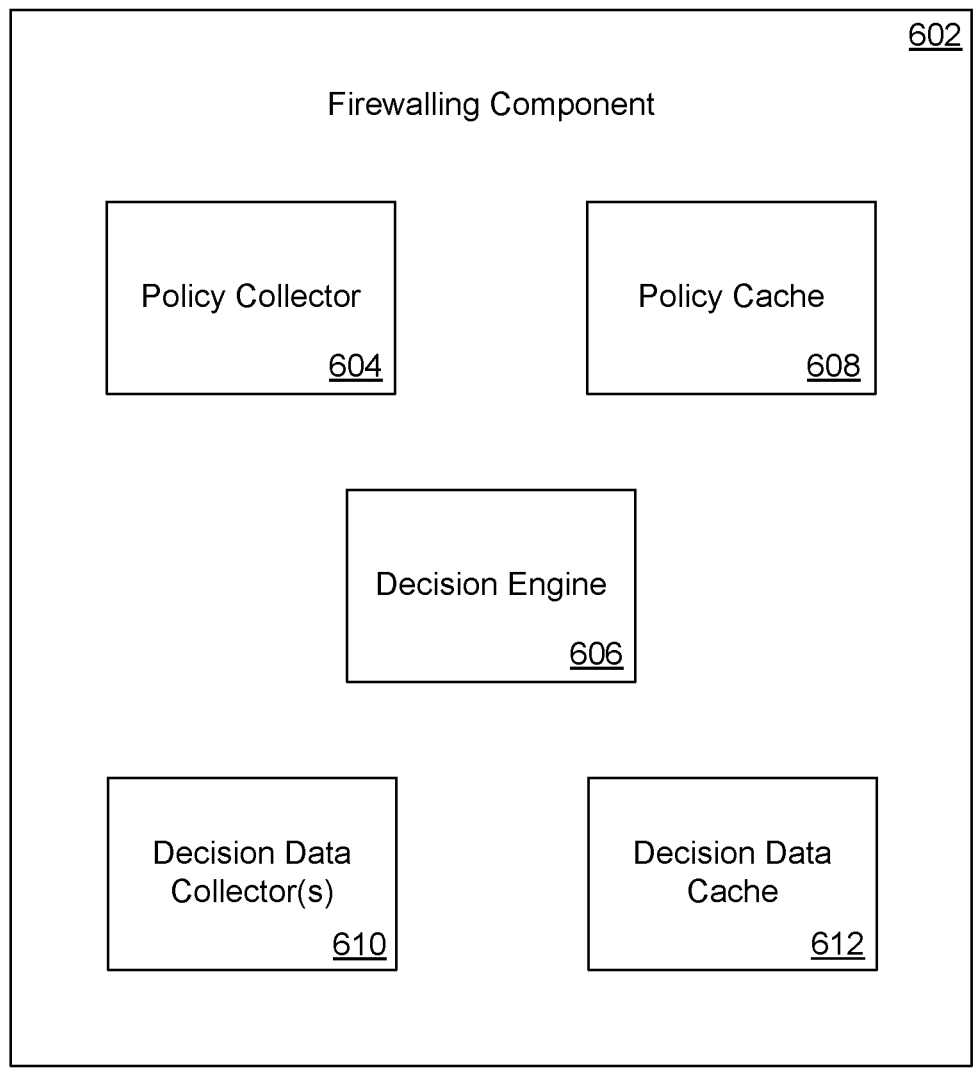
FIG. 6 is a schematic diagram depicting aspects of an example firewalling component in accordance with at least one embodiment.

Authorization of clients 204-206 (FIG. 2) and/or users of provisioned computing resources 208-212 may be subject to resource policies 334-344 (FIG. 3). In addition, utilization of each interface element 504-512 may be subject to firewalling policies of the resource policies 334-344 that are enforced by the firewalling component 434 (FIG. 4). FIG. 6 depicts aspects of an example firewalling component 602 in accordance with at least one embodiment. The firewalling component 602 of FIG. 6 is an example of the firewalling component 434 of FIG. 4.

The firewalling component 602 may include a policy collector 604 configured at least to collect relevant resource policies from maintenance locations throughout the computing resource provider 302 (FIG. 3), and store them local to a decision engine 606 in a policy cache 608. The decision engine 606 may evaluate requests submitted to the firewalling component 602 with respect to firewalling policies in the policy cache 608. At times, additional data may be required to support particular decisions with respect to particular firewalling policies. The firewalling component 602 may further include one or more decision data collectors 610 configured at least to collect the required decision support data from maintenance locations throughout the computing resource provider 302. Collected decision data may be stored local to the decision engine 606 in a decision data cache 612.

The policy collector 604 may periodically search for updates to firewalling policies stored in the policy cache 608. Alternatively, or in addition, the policy collector 604 may receive notifications of firewalling policy updates. The decision data collector(s) 610 may include a resource name data collector configured to interact with the resource name resolution service 312 (FIG. 3) to obtain mappings of resource names to computing resource 322, 324, 326, 328 locations within the computing resource provider 302 and/or location types referenced by firewalling policies in the policy cache 608 such as network addresses. The decision data collector(s) 610 may include a geographic data collector configured to interact with the geographic location mapping service 314 (FIG. 3) to obtain mappings of submitted requests to geographic locations referenced by firewalling policies in the policy cache 608. As for the policy collector 604, the decision data collector(s) 610 may periodically update decision data in the local cache 612 and/or receive notifications of decision data updates. Alternatively, or in addition, decision data cache 612 updates may be triggered responsive to a decision engine 606 request for decision data that is not present in the decision data cache 612, or that is out-of-date.

Figure 7:
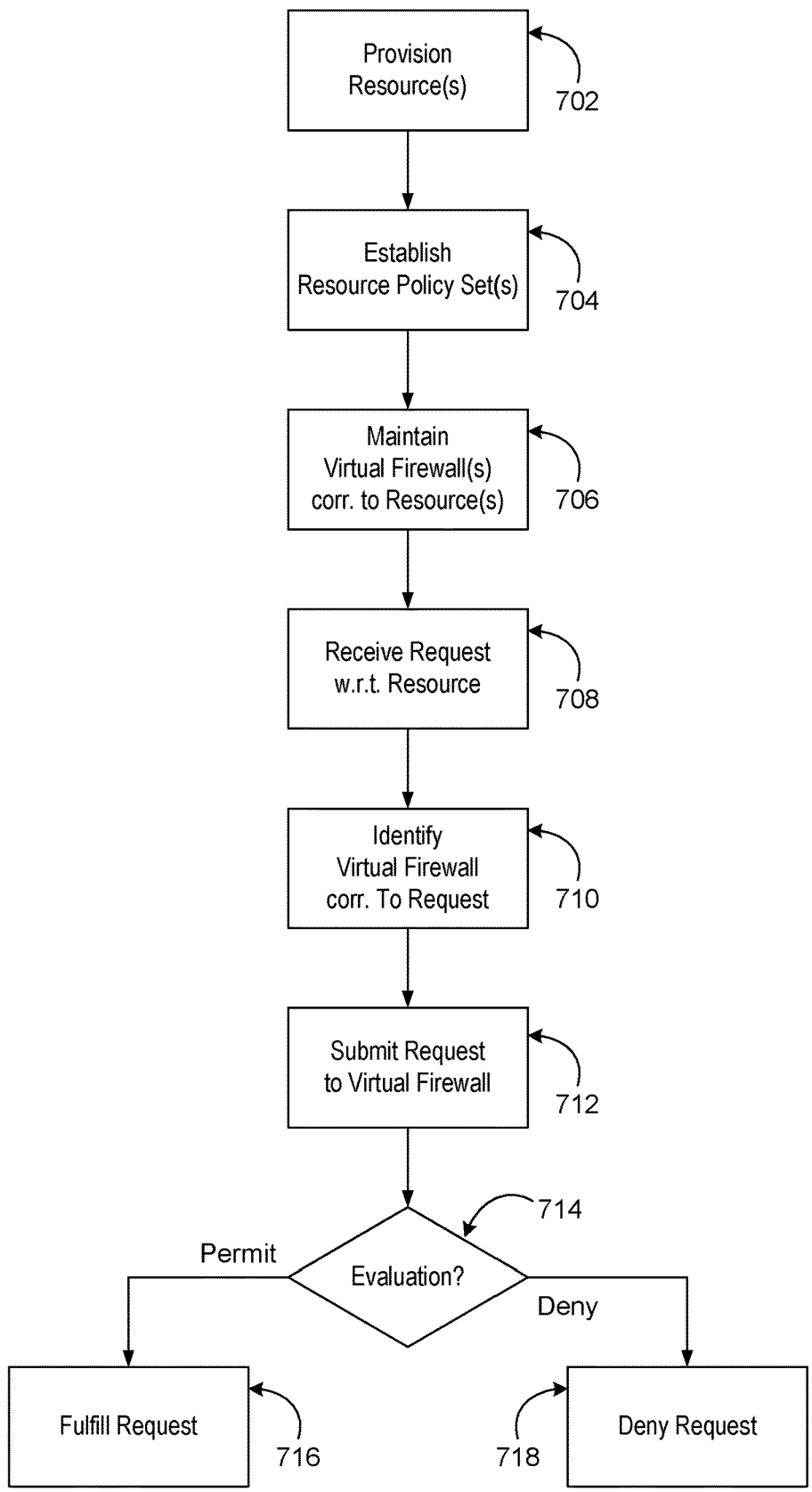
FIG. 7 is a flowchart depicting example steps for enforcing firewalling policies in accordance with at least one embodiment.

The description now turns to example procedures that may be performed by the computing resource provider 202 (FIG. 2) and/or the multi-tenant distributed services 304-306 (FIG. 3). FIG. 7 depicts example steps for enforcing firewalling policies in accordance with at least one embodiment. At step 702, one or more computing resources may be provisioned. For example, the computing resources 208-212 may be provisioned by authorized clients 204-206 with the provisioning interface 220. In at least one embodiment, interface elements of the provisioning interface 220 may be associated with firewalling policies (e.g., subsets of the resource policies 334 of FIG. 3).

At step 704, one or more sets of resource policies may be established with respect to the one or more computing resources provisioned at step 702. For example, the resource policies 334 (FIG. 3) may be established for the provisioned computing resources 322-328 with the resource policy interface 332. Default resource policy sets may be established for computing resources during provisioning. For example, a default resource policy may specify that the set of users associated with the tenant for which the computing resources of step 702 were provisioned has full access to the provisioned computing resources. At step 706, one or more virtual firewalls may be maintained corresponding to the computing resources provisioned at step 702. For example, the firewalling component 228 (FIG. 2) may maintain the virtual firewalls 230-232 corresponding to firewalling policies established at step 704.

At step 706, a request may be received with respect to one of the computing resources provisioned at step 702. For example, one of the clients 204-206 (FIG. 2) may request a data transfer from the provisioned computing resource 208 with the resource interface 222. As part of processing the request, the request may be received by the firewalling component 228. At step 710, one or more virtual firewalls corresponding to the received request may be identified. For example, the decision engine 606 (FIG. 6) may identify a set of firewalling policies in the policy cache 608 and the associated virtual firewall (e.g., of the virtual firewalls 230-232 of FIG. 2) based at least in part on the request received at step 708. At step 712, the request may be submitted to the virtual firewall identified at step 710. For example, the decision engine 606 may evaluate the request with respect to the set of firewalling policies identified at step 710 as part of maintaining the virtual firewall.

At step 714, the virtual firewall may determine whether to permit the request or else to deny the request. For example, the decision to permit or else deny the request may be based on the evaluation made by the decision engine 606 (FIG. 6) with respect to the set of firewalling policies identified at step 710. When the virtual firewall determines to permit the request, a procedure incorporating step 714 may progress to step 716. When the virtual firewall determines to deny the request, the procedure may progress to step 718. At step 716, the request may be fulfilled. For example, the resource interface 222 (FIG. 2) associated with the request may interact with the targeted computing resource 208 to perform one or more actions associated with the request. At step 718, the request may be denied. For example, the resource interface 222 may respond to the request with a request denied message. Alternatively, the resource interface 222 may silently discard the request.

Figure 8:
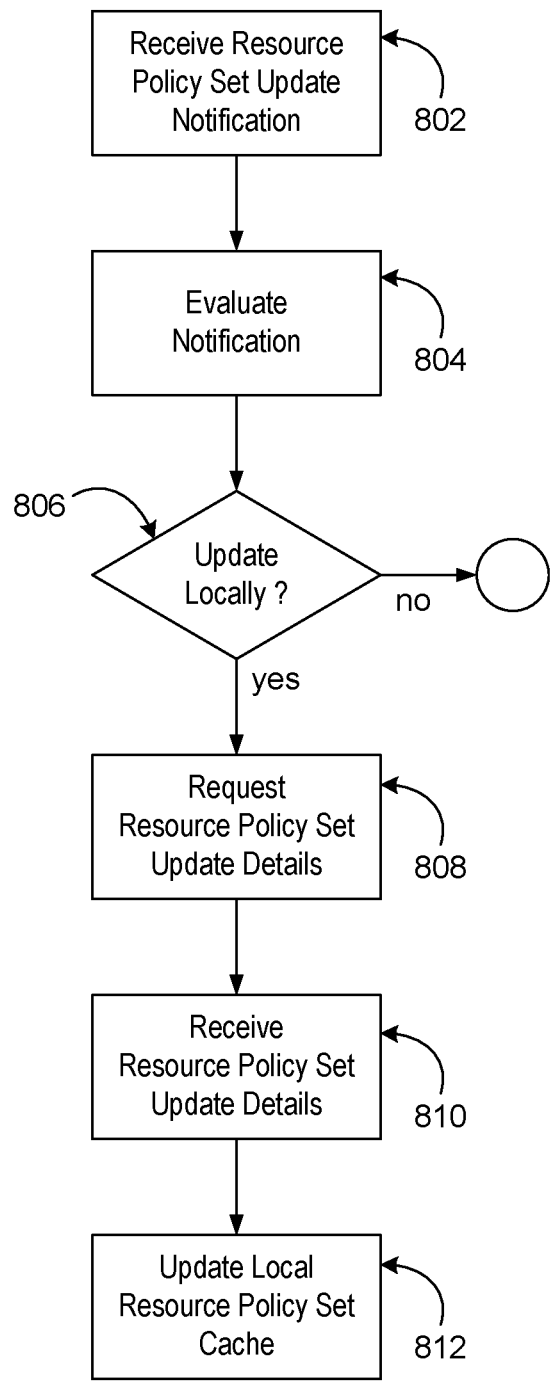
FIG. 8 is a flowchart depicting example steps for maintaining virtual firewalls in accordance with at least one embodiment.

Virtual firewalls 230-232 (FIG. 2) and associated firewalling policies may be updated and otherwise require maintenance. FIG. 8 depicts example steps for maintaining virtual firewalls 230-232 in accordance with at least one embodiment. At step 802, a policy set update notification may be received. For example, the firewalling component 228 may receive update notifications from the resource policy interface 226, the resource interfaces 222-224 and/or the provisioning interface 220. At step 804, the policy set update notification may be evaluated for relevance. For example, the firewalling component 602 (FIG. 6) may evaluate the policy set update notification for relevance with respect to firewalling policies maintained in the policy cache 608.

At step 806, it may be determined whether to update a local cache based at least in part on the policy set update notification. For example, the firewalling component 602 (FIG. 6) may determine whether to update the policy cache 608 based at least in part on the evaluation of step 804. When it is determined that the local cache is to be updated, a procedure incorporating step 806 may progress to step 808. Otherwise the procedure may progress to one or more steps not shown in FIG. 8 such as step 708 of FIG. 7.

The policy set update notification may include details of the policy set update. For example, the policy set update notification may include a copy of new firewalling policies to be enforced. Alternatively, or in addition, the policy set update notification may simply reference an updated policy set. In this case, additional steps may be required to obtain policy update details. At step 808, resource policy update details may be requested. For example, the firewalling component 602 (FIG. 6) may request resource policy update details from the policy management service 308 (FIG. 3). At step 810, the requested resource policy update details may be received. In any case, at step 812, the local resource policy set cache may updated. For example, the firewalling component 602 may update the policy cache 608 with received update details.

Figure 9:
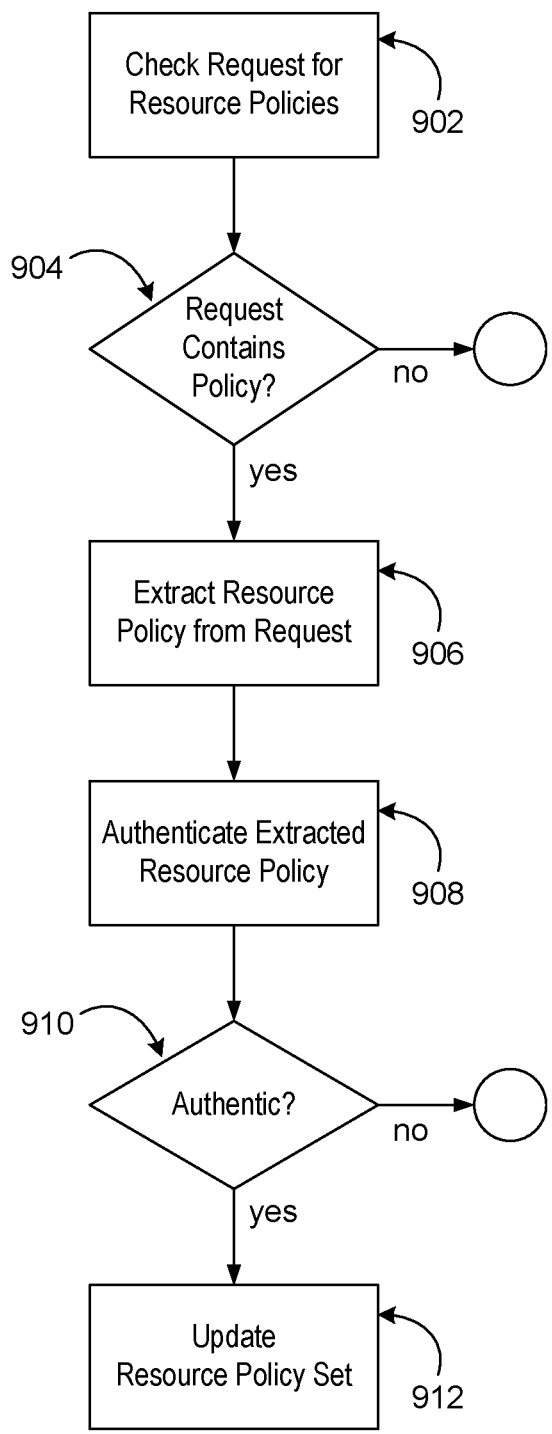
FIG. 9 is a flowchart depicting example steps for processing requests incorporating resource policies in accordance with at least one embodiment.

Requests with respect to provisioned computing resources 208-212 (FIG. 2) may incorporate resource policies, including firewalling policies, and/or resource policy updates. FIG. 9 depicts example steps for processing such requests in accordance with at least one embodiment. At step 902, a request may be checked for resource policies. For example, the policy collector 604 of the firewalling component 602 (FIG. 6) may check the request for firewalling policies. At step 904, it may be determined whether the request includes one or more relevant resource policies. For example, the policy collector 604 may determine whether a firewalling policy detected in the request is relevant to the request and/or to one or more firewalling policies in the policy cache 608. If so, a procedure incorporating step 904 may progress to step 906. Otherwise the procedure may progress to one or more steps not shown in FIG. 9 such as step 710 of FIG. 7.

At step 906, relevant resource policies detected at step 902 may be extracted and/or parsed from the request. For example, the policy collector 604 (FIG. 6) may extract one or more relevant firewalling policies from the request. At step 908, the resource policies extracted at step 906 may be authenticated. For example, the resource policies may be cryptographically signed, and the firewalling component 602 may verify the cryptographic signature and/or its authority with respect to firewalling policy updates with the authentication service 310 (FIG. 3). At step 910, it may be determined whether the resource policies extracted at step 906 are authentic based at least in part on the authentication of step 908. If so, a procedure incorporating step 910 may progress to step 912. Otherwise, the procedure may progress to one or more steps not shown in FIG. 9 such as step 710 of FIG. 7. At step 912, a resource policy set associated with the request may be updated with the authenticated resource policies. For example, the policy collector 604 may update the policy cache 608, a set of the resource policies 334 maintained by the policy management service 308 and/or a set of the resource policies 336-342 maintained by the multi-tenant distributed services 304-306.

Figure 10:
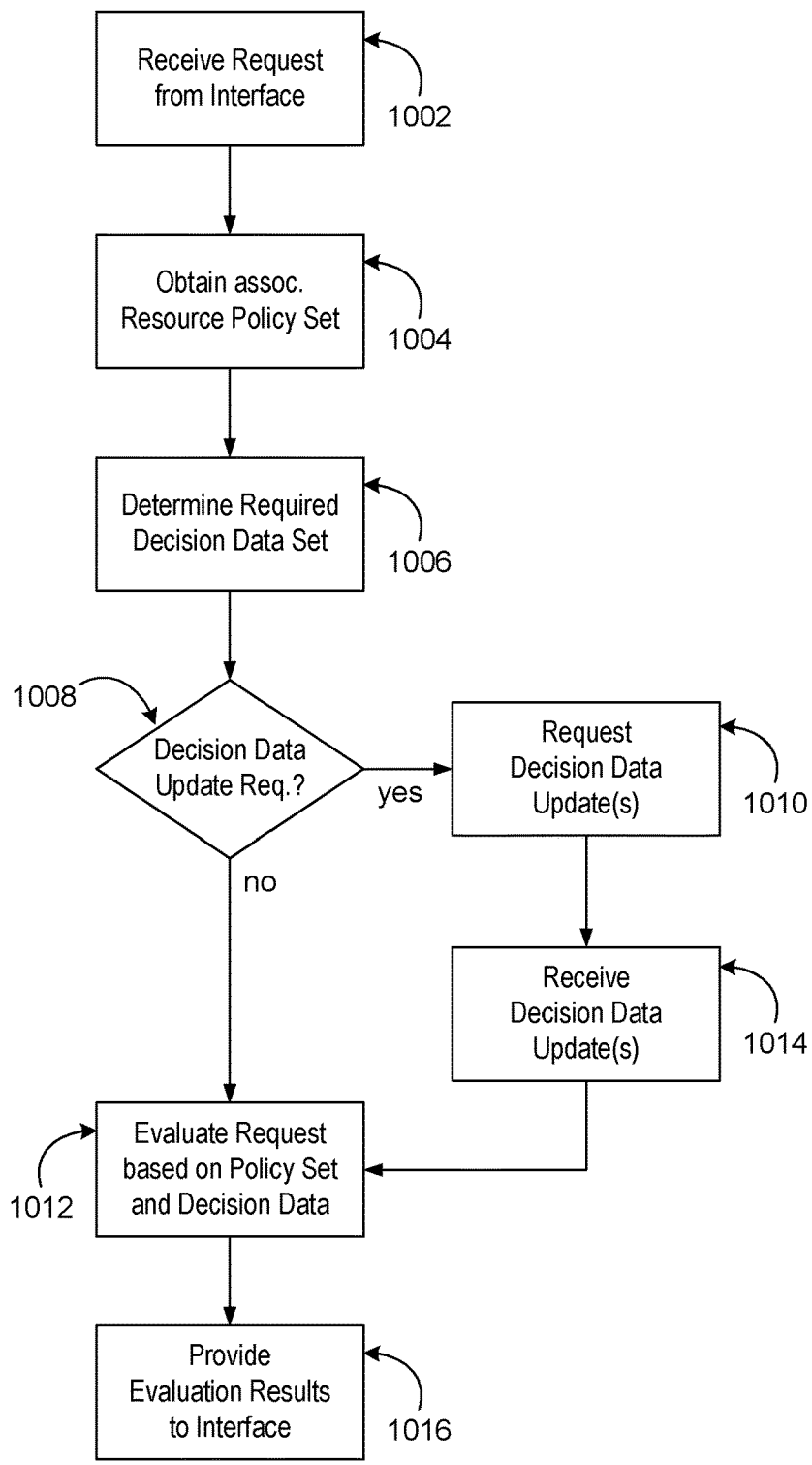
FIG. 10 is a flowchart depicting further example steps for maintaining virtual firewalls in accordance with at least one embodiment.

The resource interfaces 222-224 (FIG. 2) and the firewalling component 228 may co-operate to maintain the virtual firewalls 230-232. FIG. 10 depicts example steps for maintaining the virtual firewalls 230-232 in accordance with at least one embodiment. At step 1002, the firewalling component 228 may receive the request from one of the resource interfaces 222-224. At step 1004, the associated resource policy set may be obtained by the firewalling component 228. For example, the firewalling component 602 (FIG. 6) may search the policy cache 608 for firewalling policies relevant to the request received at step 1002.

At step 1006, a set of decision data required by the resource policy set identified at step 1004 may be determined. For example, the decision engine 606 (FIG. 6) of the firewalling component 602 may determine the required decision data set based at least in part on relevant firewalling policies identified at step 1004. At step 1008, it may determined whether a decision data update is required. For example, the decision engine 606 may attempt to obtain the required decision data set from the decision data cache 612. When a subset of the required decision data set is missing from the decision data cache 612, or out-of-date, it may determined that a decision data update is required. If so, a procedure incorporating step 1008 may progress to step 1010. Otherwise, the procedure may progress to step 1012.

At step 1010, the required decision data update(s) may be requested. For example, the decision data collector(s) 610 (FIG. 6) may request the required decision data update(s) from suitable services of the computing resource provider 302 such as the authentication service 310, the resource name resolution service 312, and/or the geographic location mapping service 314. At step 1014, the decision data update(s) requested at step 1010 may be received. The decision data update(s) may be stored in the decision data cache 612.

At step 1012, the request may be evaluated based at least in part on the resource policy set obtained at step 1004 and the decision data set determined at step 1006. For example, the decision engine 606 (FIG. 6) may evaluate the request with respect to conditions specified by the relevant firewalling policies found at step 1004. The decision engine 606 may compare decision data values associated with the request to allowed and/or disallowed such values specified by the relevant firewalling policies. In at least one embodiment, the decision engine 606 may determine whether the request is to be permitted or else denied as part of the evaluation of step 1012. At step 1016, the firewalling component 602 may provide the evaluation results to the resource interface from which it received the request.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computerized system facilitating a multi-tenant distributed service, comprising:
a resource server computer configured to at least:
maintain a plurality of provisioned resources of the multi-tenant distributed service, the plurality of provisioned resources provisioned on behalf of a tenant of the multi-tenant distributed service
that is enabled to delegate authority to a plurality of users to establish a plurality of resource policy sets with respect to the plurality of provisioned resources that are provisioned on behalf of the tenant;
receive requests with respect to the plurality of provisioned resources;
identify an individual policy of the plurality of resource policy sets that is associated with a request of the received requests based at least in part on conditions associated with the request, the conditions
including a network protocol, a time period associated with the request, and an operating environment parameter associated with the request, the operating environment parameter including an
originating administrative division associated with the request and a determination that the request originated from a particular external client or a particular internal multi-tenant distributed service;
determine a decision data set from a decision data cache based at least in part on the identified individual policy, the decision data set including resource name resolution data and geographic location
mapping data, the geographic location mapping data corresponding to an origin network address associated with the request or a destination network address associated with the request;
update the decision data cache based on the determined decision data set;
evaluate the request with respect to the individual policy and the determined decision data set; and
update the plurality of resource policy sets based on evaluation of a resource policy set update notification.

2. The computerized system of claim 1, wherein the resource server computer includes at least one Web-based interface server computer, and the requests include requests in accordance with a Web-based protocol.

3. One or more non-transitory computer-readable media having collectively thereon computer-executable instructions that, when executed by one or more computers, cause the one or more computers to collectively perform operations comprising:
maintaining a plurality of resource policy sets established by a plurality of service users with respect to a plurality of provisioned resources of a multi-tenant distributed service that are provisioned on behalf of a tenant of the multi-tenant distributed service, a policy set of the plurality of resource policy sets corresponding to the tenant of the multi-tenant distributed service, and the tenant enabled to authorize one or more of the plurality of service users to establish the policy set with respect to the plurality of provisioned resources that are provisioned on behalf of the tenant;
receiving a request with respect to a provisioned resource of the plurality of provisioned resources;

identifying an individual policy of the policy set associated with the request based at least in part on conditions associated with the request, the conditions including a network protocol, a time period associated with the request, and an operating environment parameter associated with the request, the operating environment parameter including an originating administrative division associated with the request and a determination that the request originated from a particular external client a particular internal multi-tenant distributed service;

determining a decision data set from a decision data cache based at least in part on the identified individual policy, the decision data set including resource name resolution data and geographic location mapping data, the geographic location mapping data corresponding to an origin network address associated with the request or a destination network address associated with the request;

updating the decision data cache based on the determined decision data set;

evaluating the request based at least in part on the individual policy and the determined decision data set, the individual policy associated with the provisioned resource, and the individual policy identifying the one or more conditions to be fulfilled before a set of actions are permitted with respect to the provisioned resource; and updating the plurality of resource policy sets based on evaluation of a resource policy set update notification.

4. The one or more non-transitory computer-readable media of claim 3, wherein:
the plurality of provisioned resources includes disjoint sets of provisioned resources corresponding to tenant boundaries, each tenant boundary corresponds to one of the plurality of resource policy sets including the policy set; and
the policy set includes the individual policy that conditions success of the request based at least in part on whether the request would cause data from the provisioned resource to cross the corresponding tenant boundary.

5. The one or more non-transitory computer-readable media of claim 3, wherein:
the plurality of provisioned resources includes sets of provisioned resources corresponding to geographic boundaries; and
the policy set includes the individual policy that conditions success of the request based at least in part on whether the request would cause data from the provisioned resource to cross one of the geographic boundaries.

6. A computer-implemented method for a multi-tenant distributed service, comprising:
maintaining, by a computing system of the multi-tenant distributed service, a resource policy set comprising at least a policy that identifies a condition to be fulfilled before an action is permitted with respect to a plurality of provisioned resources maintained by the multi-tenant distributed service and provisioned on behalf of a tenant of the multi-tenant distributed service, the resource policy set being associated with the plurality of provisioned resources and established by a user authorized by the tenant of the multi-tenant distributed service;

receiving a request for a provisioned resource of the plurality of provisioned resources that are provisioned on behalf of the tenant;

identifying an individual policy of the resource policy set associated with the request based at least in part on conditions associated with the request, the conditions including a network protocol, a time period associated with the request, and an operator environment parameter associated with the request, the operating environment parameter including an originating administrative division associated with the request and a determination that the request originated from a particular external client or a particular internal multi-tenant distributed service;

determining a decision data set from a decision data cache based at least in part on the identified individual policy, the decision data set including resource name resolution data and geographic location mapping data, the geographic location mapping data corresponding to an origin network address associated with the request or a destination network address associated with the request;

updating the decision data cache based on the determined decision data set;

evaluating the request based at least in part on the decision data set and the one or more conditions associated with the individual policy being fulfilled to permit one or more actions associated with the request; and updating the resource policy set based on evaluation of a resource policy set update notification.

7. The computer-implemented method of claim 6, wherein the resource policy set includes the individual policy that conditions success of the request based at least in part on at least one of: a physical layer communication parameter associated with the request, a data link layer communication parameter associated with the request, a network layer communication parameter associated with the request, a transport layer communication parameter associated with the request.

8. The computer-implemented method of claim 6, wherein:
the plurality of provisioned resources of the multi-tenant distributed service includes a plurality of provisioned resource types; and
the resource policy set includes the individual policy that conditions success of the request based at least in part on a set of the provisioned resource types associated with the request.

9. The computer-implemented method of claim 6, wherein:
each of a plurality of tenants of the multi-tenant distributed service corresponds to a set of the plurality of provisioned resources; and
the resource policy set includes the individual policy that conditions success of the request based at least in part on at least one tenant associated with the request.

10. The computer-implemented method of claim 6, further comprising obtaining resource policies in the resource policy set from a plurality of network locations within the multi-tenant distributed service including at least one remote network location with respect to a resource policy management component.

11. The computer-implemented method of claim 10, wherein the resource polices obtained from the at least one remote network location are cached locally with respect to the resource policy management component.

12. The computer-implemented method of claim 10, wherein the resource policies in the resource policy set are selected based at least in part on the request.

13. The computer-implemented method of claim 10, wherein obtaining the resource policies in the resource policy set comprises obtaining at least one resource policy from the request and cryptographically authenticating the at least one resource policy.

14. The computer-implemented method of claim 6, wherein the resource policy set includes a policy set with respect to provisioning at least one of the plurality of provisioned resources of the multi-tenant distributed service.

15. The computer-implemented method of claim 6 further comprising checking whether an update of the resource policy set is required based at least in part on information associated with the request.

16. The computer-implemented method of claim 15 further comprising submitting a subsequent request targeting the provisioned resource, in a supervisory layer of the multi-tenant distributed service, to a resource policy management component to obtain enforcement of the resource policy set, the subsequent request based at least in part on the request.

17. The computer-implemented method of claim 6, wherein the plurality of provisioned resources being maintained by the multi-tenant distributed service are maintained within the multi-tenant distributed service and the request targeting the provisioned resource originates from outside the multi-tenant distributed service.

18. The computer-implemented method of claim 6, wherein the plurality of provisioned resources includes a plurality of types of provisioned computing resources, access to each type of provision resource is provided with a corresponding user interface maintained by a set of interface server computers.

* * * * *